US007197913B2

(12) United States Patent
Zhu et al.

(10) Patent No.: US 7,197,913 B2
(45) Date of Patent: Apr. 3, 2007

(54) LOW COST CIRCUIT FOR IC ENGINE DIAGNOSTICS USING IONIZATION CURRENT SIGNAL

(75) Inventors: Guoming G. Zhu, Novi, MI (US); Kevin D. Moran, Trenton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 161 days.

(21) Appl. No.: 10/655,273

(22) Filed: Sep. 4, 2003

(65) Prior Publication Data

US 2005/0050948 A1 Mar. 10, 2005

(51) Int. Cl.
*G01M 15/00* (2006.01)
*G01L 23/22* (2006.01)

(52) U.S. Cl. .................................... 73/35.08; 73/118.1

(58) Field of Classification Search ............... 73/35.08, 73/35.01, 35.03, 35.06, 35.07, 116, 117.2, 73/117.3, 118.1
See application file for complete search history.

(56) References Cited

U.S. PATENT DOCUMENTS 5,060,623 A 10/1991 McCoy
5,337,717 A 8/1994 Scheel et al.
5,343,844 A 9/1994 Fukui et al.
5,425,339 A * 6/1995 Fukui .................... 123/406.26
5,534,781 A 7/1996 Lee et al.
5,672,972 A 9/1997 McCoy et al.
5,781,012 A 7/1998 Yasuda
6,011,397 A 1/2000 Yasuda
6,075,366 A 6/2000 Yasuda
6,104,195 A * 8/2000 Yoshinaga et al. .......... 324/459
6,196,054 B1 * 3/2001 Okamura et al. .......... 73/35.08
6,202,474 B1 3/2001 Takahashi et al.
6,205,844 B1 3/2001 Morita et al.
6,263,727 B1 7/2001 Butler, Jr.

(Continued)

FOREIGN PATENT DOCUMENTS

DE 19816641 10/1999

(Continued)

OTHER PUBLICATIONS

Combined Search and Examination Report under Section 17 and 18(3); European Patent Office; dated Dec. 17, 2004; 7 pages.

(Continued)

*Primary Examiner*—Eric S. McCall
(74) *Attorney, Agent, or Firm*—Dickinson Wright PLLC

(57) ABSTRACT

This feature of the present invention comprises a method, apparatus, and system for detecting and conditioning an ionization current signal. In one embodiment of the invention, an analog signal conditioning circuit detects and processes the ionization signal. The analog signal conditioning circuit uses a signal isolator having an input and an output, an amplifier having a first and a second input, and a first and a second output, wherein the first input operably connected to the signal isolator output, a peak detector having a first and a second input, and an output, wherein the first input is operably connected to the first output of the amplifier, and an integrator having a first and a second input, and an output, wherein the first input is operably connected to the second output of the amplifier.

12 Claims, 11 Drawing Sheets

U.S. PATENT DOCUMENTS

| | | | | |
|---|---|---|---|---|
| 6,275,041 | B1 | 8/2001 | Okamura et al. | |
| 6,336,355 | B1 | 1/2002 | Sasaki et al. | |
| 6,360,587 | B1 | 3/2002 | Noel | |
| 6,367,318 | B1 | 4/2002 | Boyer et al. | |
| 6,922,628 | B2 * | 7/2005 | Zhu et al. | 701/111 |
| 2002/0144544 | A1 | 10/2002 | Kesler | |
| 2003/0080745 | A1 | 5/2003 | Hanazaki et al. | |
| 2004/0084026 | A1 | 5/2004 | Zhu et al. | |
| 2004/0084036 | A1 | 5/2004 | Porter et al. | |
| 2004/0099530 | A1 * | 5/2004 | Bolz | 204/406 |
| 2005/0114012 | A1 * | 5/2005 | Zhu et al. | 701/114 |

FOREIGN PATENT DOCUMENTS

| | | | |
|---|---|---|---|
| EP | 1217207 | | 6/2002 |
| GB | 2395522 | A | 5/2004 |
| WO | WO 97124527 | A1 | 7/1997 |

OTHER PUBLICATIONS

Preliminary Search Report dated Nov. 6, 2006, French Patent Office, 2 pages.

* cited by examiner

| REGION | a | BETWEEN a & b | b | BETWEEN b & c | c | BETWEEN c & d | d | AFTER d |
|---|---|---|---|---|---|---|---|---|
| NOMINAL DURATION | 100 μs | 100 μs | 500 μs | 200 μs (P 1) (CALIBRATABLE) | 100 μs | 100 μs | P 2*1000/(6rpm) (ms) (CALIBRATABLE) | UNTIL NEXT CYL RESET |
| MISFIRE ON/OFF CTRL | HIGH | HIGH | LOW | HIGH | HIGH | HIGH | PWM (f=10kHz), DUTY CYCLE FUNCTION OF RPM | HIGH |
| MISFIRE RST CTRL | HIGH | LOW | LOW | LOW | HIGH | LOW | LOW | LOW |
| A/D READING | | | | 10 BIT A/D | | | | 10 BIT A/D |

FIG. 8

LOW COST CIRCUIT FOR IC ENGINE DIAGNOSTICS USING IONIZATION CURRENT SIGNAL

BACKGROUND OF THE INVENTION

1. Technical Field

This invention relates to the field of internal combustion engine diagnostics and control. More particularly, it relates to a low cost circuit for internal combustion engine diagnostics using an ionization signal.

2. Discussion

Combustion of an air/fuel mixture in the combustion chamber of in an internal combustion (IC) engine produces ions that can be detected. If a voltage is applied across a gap of a spark plug, these ions are attracted and will create a current. This current produces a signal called an ionization current signal $I_{ION}$ that may be detected. After the ionization current signal $I_{ION}$ is detected, the signal may be processed and sent to a powertrain control module (PCM) for engine diagnostics and closed-loop engine combustion control. A variety of methods have been used to detect and process the ionization current signal $I_{ION}$ that are produced in a combustion chamber of an internal combustion engine.

SUMMARY OF THE INVENTION

In view of the above, the present invention relates generally to one or more improved methods, systems, and/or circuits for sampling and conditioning an ionization current signal in the combustion chamber of an internal combustion engine.

In a preferred embodiment, the present invention comprises a method of signal conditioning, comprising the steps of detecting an ionization signal and processing the ionization signal.

In a further embodiment, the invention comprises the steps of resetting a peak detector and an integrator, peak detecting and integrating the ionization signal, and outputting a peak ionization value and an integrated ionization value.

In another embodiment, the invention comprises an analog signal conditioning circuit comprising a signal isolator having an input and an output, an amplifier having a first and a second input, and a first and a second output, wherein the first input is operably connected to the signal isolator output, a peak detector having a first and a second input, and an output, wherein the first input is operably connected to the first output of the amplifier, and an integrator having a first and a second input, and an output, wherein the first input is operably connected to the second output of the amplifier.

In a further embodiment, the invention comprises an engine, comprising a plurality of cylinder banks and a plurality of analog signal conditioning circuits operably connected to each of the plurality of cylinder banks, wherein at least one of the analog signal conditioning circuits comprises a signal isolator having an input and an output, an amplifier having a first and a second input, and a first and a second output, wherein the first input is operably connected to the output of the signal isolator, a peak detector having a first and a second input, and an output, wherein the first input is operably connected to the first output of the amplifier, and an integrator having a first and a second input, and an output, wherein the first input is operably connected to the second output of the amplifier.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 8 is a table showing the relationship between the on/off and the reset control signals of FIG. 7;

DETAILED DESCRIPTION OF PREFERRED EMBODIMENTS

The present invention detects an ionization signal produced in a combustion chamber of an internal combustion engine (IC) and conditions the ionization signal in an analog circuit to generate ionization signal values that may be used within a powertrain control module (PCM) for engine diagnostic and closed-loop engine control routines.

This detailed description includes a number of inventive features generally related to the detection and/or use of an ionization signal. The features may be used alone or in combination with other described features. While one or more of the features are the subject of the pending claims, other features not encompassed by the appended claims may be covered by the claims in one or more separate applications filed by or on behalf of the assignee of the present application.

In a Spark Ignition (SI) engine, the spark plug extends inside of the engine combustion chamber and may be used as a detection device. Use of the spark plug as a detection device eliminates the need to place a separate sensor into the combustion chamber to monitor conditions inside of the combustion chamber.

During combustion, chemical reactions at the flame front produce a variety of ions in the plasma. These ions, which include $H_3O^+$, $C_3H_3^+$, and $CHO^+$ ions, have an exciting time that is sufficiently long in duration to be detected. By applying a voltage across the spark plug gap, these free ions may be attracted to the region of the spark plug gap to produce an ionization current signal $I_{ION}$ 100*a*–100*n*.

Figure 1:
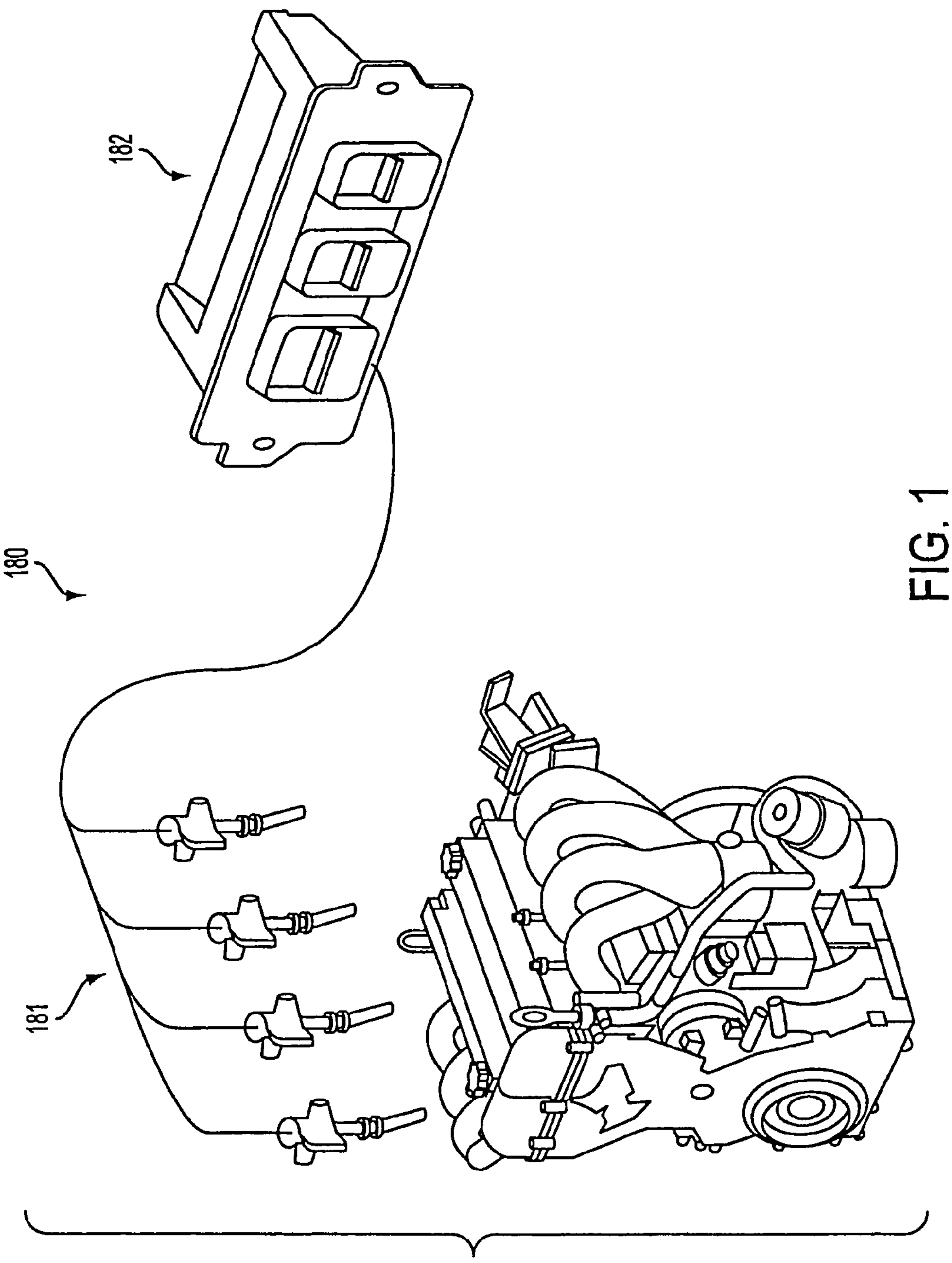
FIG. 1 illustrates an ionization current detection setup.

As shown in FIG. 1, an ionization current detection setup 180 consists of a coil-on-plug arrangement, with a device in each coil to apply a bias voltage across the spark plug gap (i.e., the spark plug tip). The ionization current produced across the spark plug gap is isolated and amplified prior to being measured. The coils 181 (with ion detection) are attached to a module 182 (with ion processing).

A spark plug ionization current signal $I_{ION}$ measures the local conductivity at the spark plug gap when ignition and combustion occur in the cylinder. Changes in the ionization current signal how $I_{ION}$ 100*a*–100*n* versus the engine crank angle for a cylinder can be related to different stages of the combustion process. The ionization current signal $I_{ION}$ 100*a*–100*n* typically has two phases: the ignition or spark phase 220 and the post-ignition or combustion phase 230. The ignition phase 220 is where the ignition coil is charged and later ignites the air/fuel mixture. The post-ignition phase 230 is where combustion occurs. The post ignition phase 230 typically has two phases: the flame front phase and the post-flame phase. The flame front phase is where the combustion flame (flame front movement during the flame kernel formation) develops in the cylinder. Under ideal circumstances, the flame front phase consists of a single peak 240. The ionization current signal $I_{ION}$ 100*a*–100*n* produced during the flame front phase has been shown to be strongly related to the air/fuel ratio. The post-flame phase depends on the temperature and the pressure that develops in the cylinder. The post-flame phase generates an ionization current signal $I_{ION}$ 100*a*–100*n* whose peak 250 is well correlated to the location of peak cylinder pressure, as discussed in more detail below.

Figure 2:
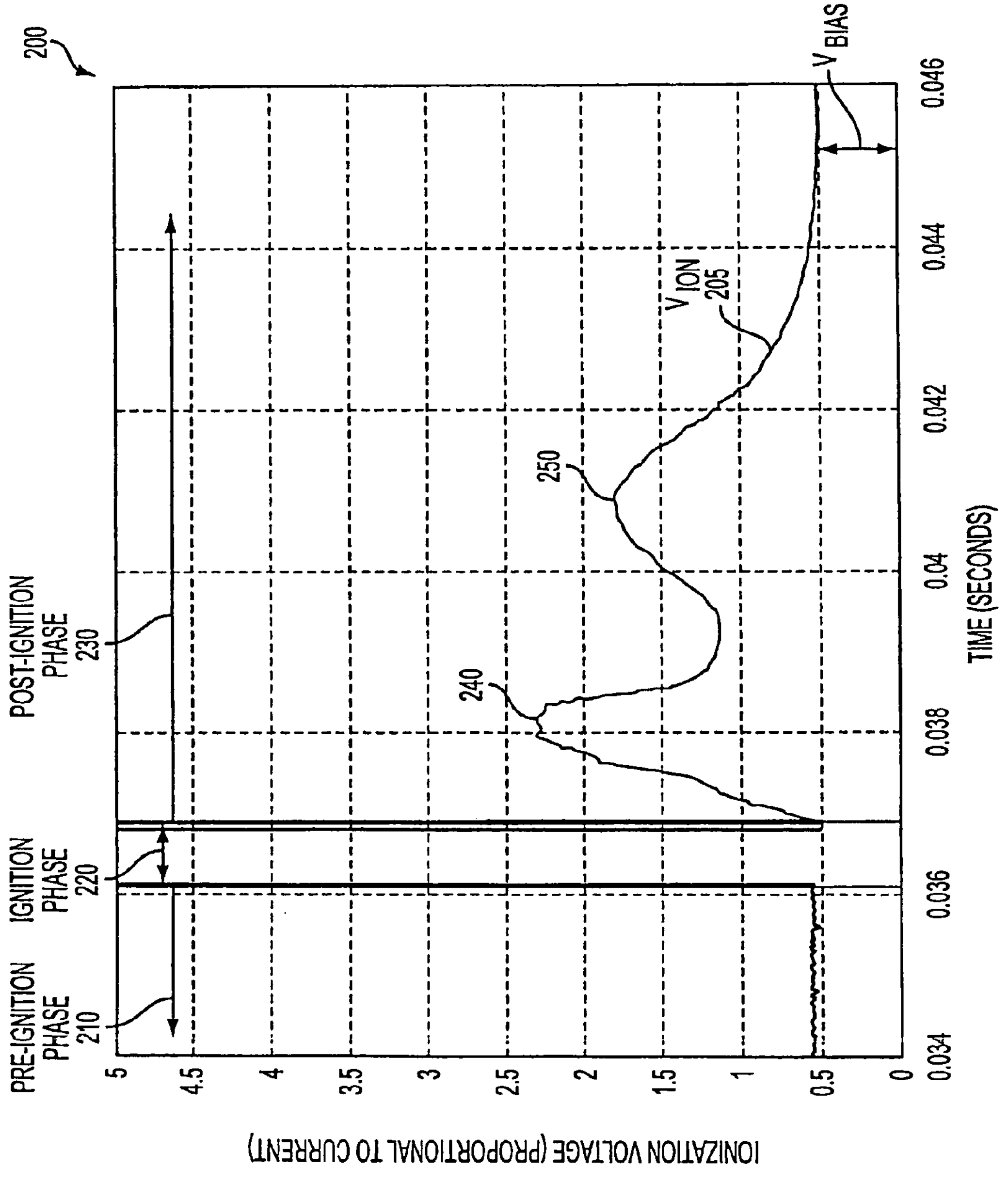
FIG. 2 is a graph of an ionization voltage signal.

FIG. 2 is a graph of an ionization voltage signal $V_{ION}$ 205 that results from the formation of an ionization current across a spark plug gap during the ignition phase 220 and the post-ignition phase 230. Note that the signal shown 205 is an ionization voltage $V_{ION}$, which is proportional to the detected ionization current $I_{ION}$ 100*a*–100*n* that flows across the spark plug gap during and after ignition. A bias voltage $V_{BIAS}$ is applied across the spark plug gap during the pre-ignition phase 210, the ignition phase 220, and the post-ignition phase 230. In a preferred embodiment, the bias voltage $V_{BIAS}$ is approximately 80 V. However, it will be appreciated by one of ordinary skill in the art that a bias voltage $V_{BIAS}$ greater or less than this value may be used depending upon engine operating conditions.

FIG. 2 is graph 200 that shows the ignition phase 220 and the post-ignition phase 230 of the ionization current $I_{ION}$ 100*a*–100*n*. During the ignition phase 220, the ionization signal represents the combined ignition current and the ionization current $I_{ION}$ 100*a*–100*n* . Following the ignition phase 220, the bias voltage $V_{BIAS}$ attracts ions formed during combustion of the air/fuel mixture. As the ions, which typically include $H_3O^+$, $C_3H_3^+$, and $CHO^+$ions, are attracted to the region of the spark plug gap by the bias voltage $V_{BIAS}$, an ionization current flows across the spark plug gap or tip. This ionization current is represented by the ionization voltage signal $V_{ION}$ 205 in FIG. 2.

Figure 3:
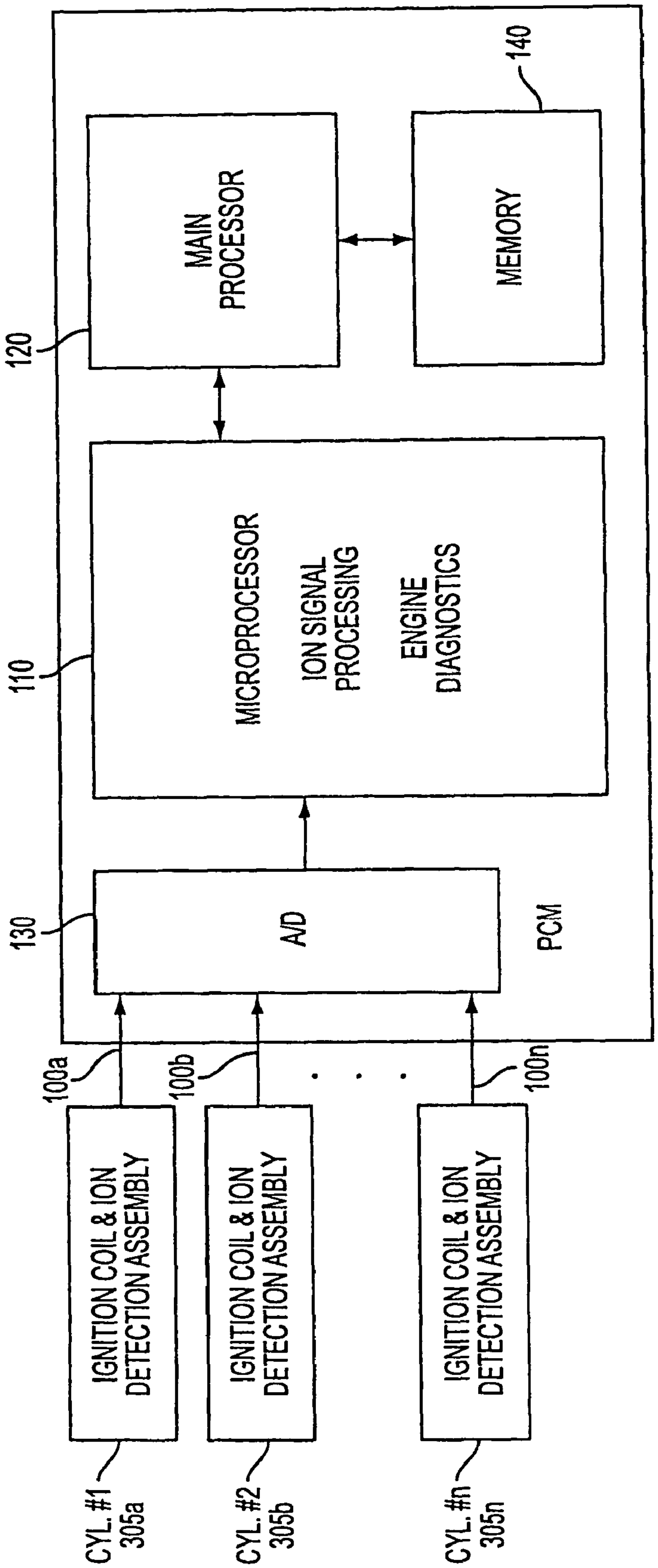
FIG. 3 illustrates an alternative engine diagnostic system.

FIG. 3 illustrates an ionization signal conditioning system for processing ionization signals according to an embodiment of the invention. This system samples the ionization current signal $I_{ION}$ 100*a*–100*n* directly, e.g., using an analog-to-digital (A/D) converter 130. Then, it processes the sampled ionization current signal $I_{ION}$ 100*a*–100*n* in a microprocessor 110. This circuit samples the ionization current signal $I_{ION}$ 100*a*–100*n* at every crank degree of resolution over the compression and the expansion strokes. The sampled ionization current signal $I_{ION}$ 100*a*–100*n* is processed in the microprocessor 110 to accommodate the data sampling rate of the A/D convener 130. The microprocessor 110 processes the ionization current signal $I_{ION}$ 100*a*–100*n* and performs various engine diagnostic and control routines using the processed ionization current signal $I_{ION}$ 100*a*–100*n*. The microprocessor 110 then sends the processed ionization current signal $I_{ION}$ 100*a*–100*n* to the main processor 120 of the PCM for engine diagnostics and closed loop enaine combustion control. The PCM fbrther includes memory 140 that is operably connected to the main processor 120.

Figure 4:
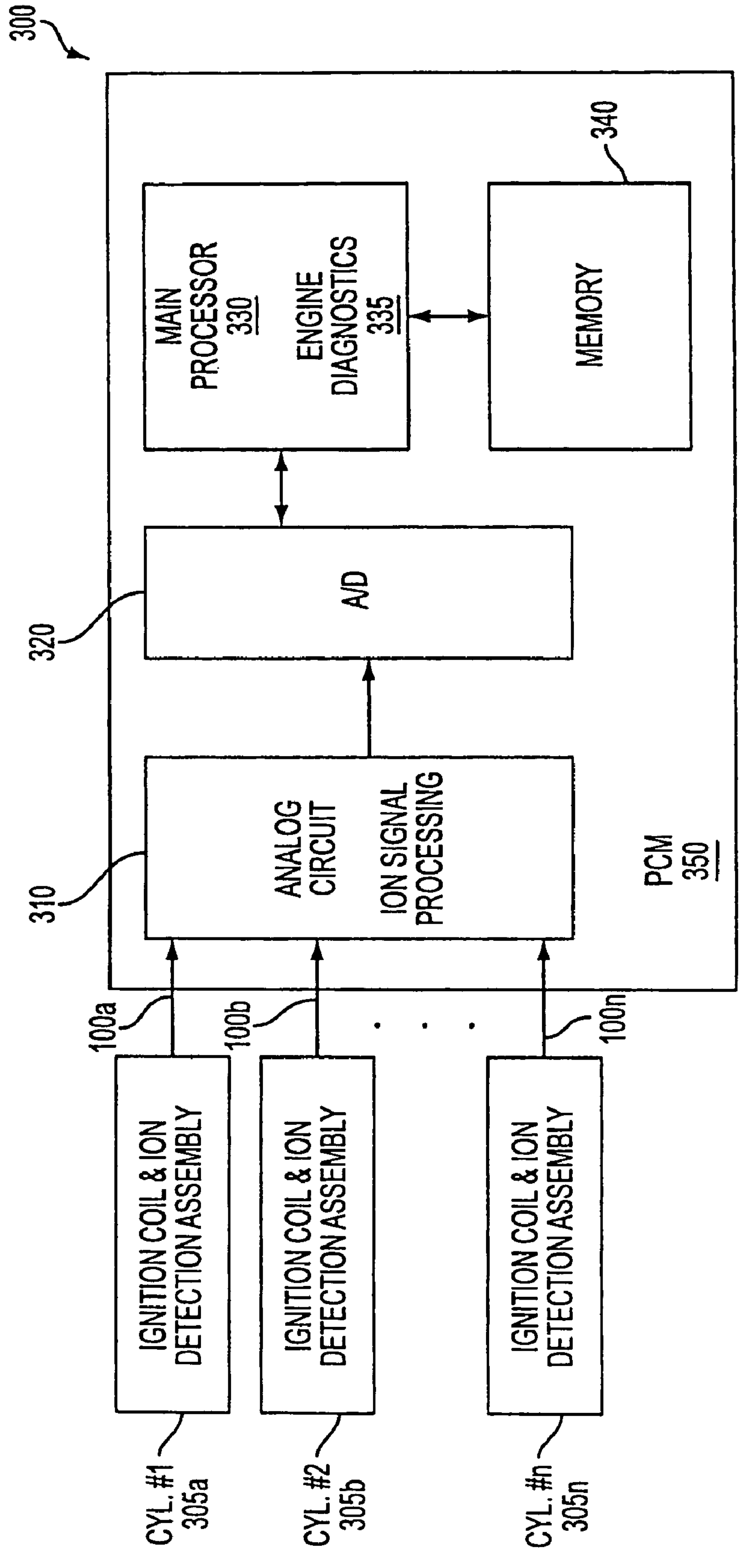
FIG. 4 illustrates an ionization signal conditioning system.

FIG. 4 illustrates an ionization signal conditioning system 300 of a preferred embodiment of the invention. The ionization current signals $I_{ION}$ 100*a*–100*n* are transmitted from the ion detection assemblies 305*a*–305*n* of each engine cylinder to an analog circuit 310 for signal processing and conditioning. From the analog circuit 310, the conditioned ionization current signals $I_{ION}$ 100*a*–100*n* are transmitted to the analog-to-digital (A/D) converter 320. The analog-to-digital (A/D) converter 320, in turn, transmits the digitized ionization signals $I_{ION}$ 100*a*–100*n* to the main processor 330 of the powertrain control module (PCM) 350. The powertrain control module (PCM) 350 uses the conditioned, digitized signals to perform various engine diagnostic and control routines 335. These routines include cylinder identification, full range misfire/partial-burn detection, failed coil/ion-sensing assembly, input short to ground, open-secondary detection, bank sensor/input short to battery, and similar routines. This configuration enables the analog circuit 310 and the engine diagnostic routines 335 of the main processor 330 of the powertrain control module (PCM) 350 to be recalibrated. Recalibration of the ionization signal conditioning system 300 enables processing of the ionization current signal $I_{ION}$ 100*a*–100*n* to occur over a wide range of IC engine and combustion operating conditions and parameters.

Figure 5:
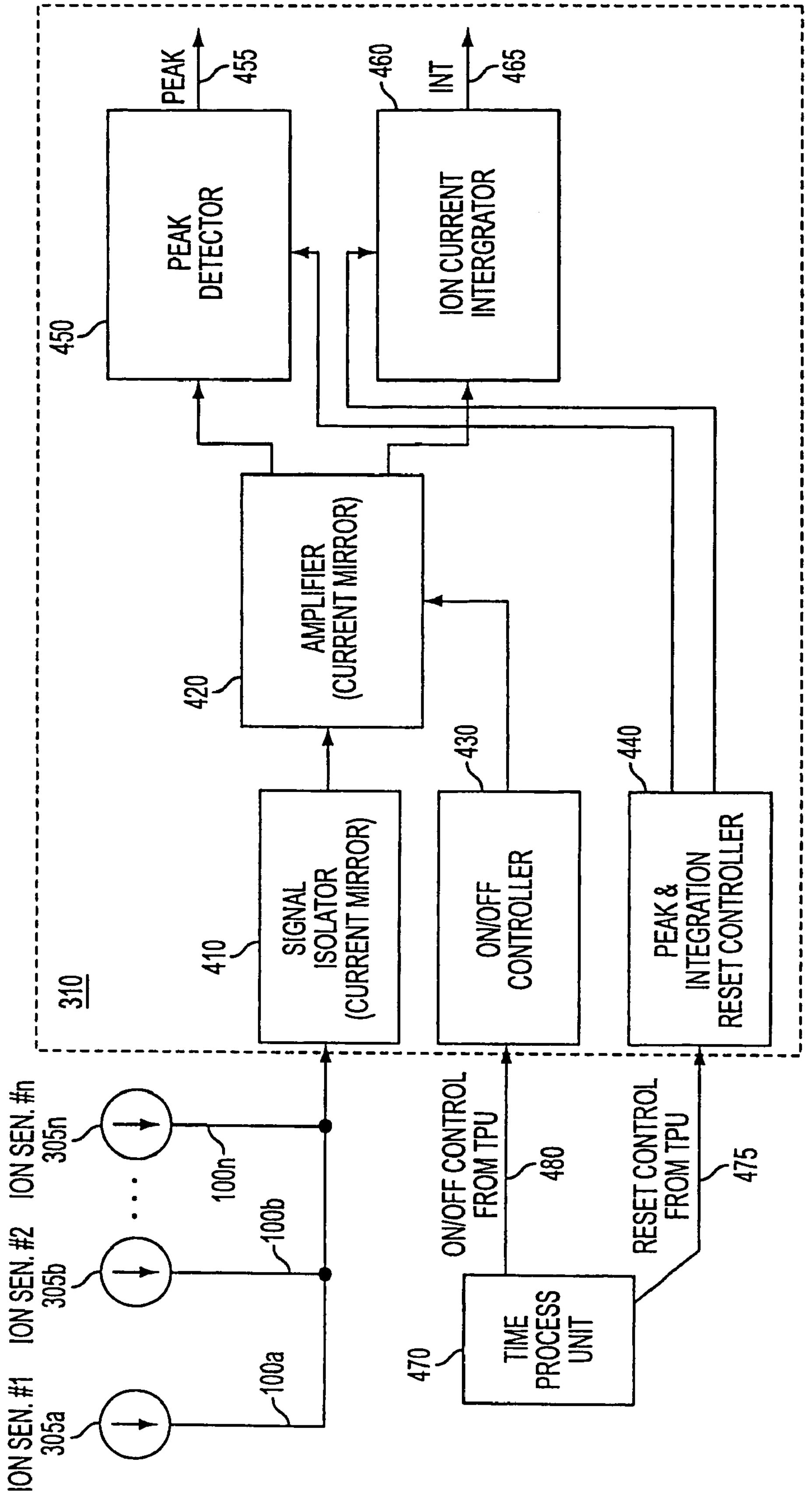
FIG. 5 illustrates an ionization signal conditioning circuit.

The analog signal conditioning system 310 of a preferred embodiment of the invention is illustrated in FIG. 5. The analog signal conditioning system 310 comprises a signal isolator 410, an amplifier 420, an on/off controller 430, a reset controller 440, a peak detector 450, and an ionization current integrator 460.

Two types of signals are input into the analog signal conditioning system 310. The analog signal conditioning system 310 receives ionization signals 100*a*–100*n* from the ionization sensors 305*a*–305*n* of an internal combustion engine. The analog signal conditioning system 310 also receives on/off control signals 480 and reset control signals 475 from a time processor, e.g., a time process unit (TPU) 470, of the powertrain control module (PCM) 350.

The ionization signals $I_{ION}$ 100*a*–100*n* received from the ionization sensors 305*a*–305*n* are current sources. Due to the sequential nature of the engine cylinder combustion cycles, the ionization current signals 100*a*–100*n* may be combined or multiplexed without signal loss or distortion. Thus, they may be combined as a single input to the signal isolator 410 of the analog signal conditioning system 310. One reason that the ionization current signals $I_{ION}$ 100*a*–100*n* can be multiplexed into one pin is that the ionization current signals $I_{ION}$ 100*a*–100*n* are active only during the following periods: charging of the primary winding, ignition, and combustion. These three periods, cumulatively referred to as a cylinder's active period, cover less than 180 crank degrees (see FIG. 7). Another reason is that the ionization current signals $I_{ION}$ 100*a*–100*n* are current source signals. Therefore, they can be merged into a single signal that combines all of the individual ionization signals 100*a*, 100*b*, 100*n* from each cylinder without any significant loss of ionization signal information.

The signal isolator 410 isolates the detected ionization current signal and subtracts the bias current $I_{BIAS}$ from the sensed ionization current signal $I_{ION}$ 100*a*-100*n*. The bias current $I_{BIAS}$ is produced by the ionization detection circuit for diagnostic purposes. The signal isolator 410 removes this bias current $I_{BIAS}$ from the sensed ionization current signal $I_{ION}$ to reproduce an isolated ionization current signal $I_{ION}$ 100*a*–100*n* that is conditioned further by the analog signal conditioning system 310.

The on/off controller 430 receives the on/off control signals 480 from the time process unit (TPU) 470 of the powertrain control module (PCM) 350. The on/off controller 430 processes the on/off signals 480 and sends control signals to the amplifier 420 to turn the amplifier 420 "On" and "Off" to enable peak detection and integration of the ionization current signal $I_{ON}$ 100*a*–100*n*.

The amplifier 420 amplifies the isolated ionization current signal $I_{ION}$ 100*a*–100*n* and receives the control signals from the on/off controller 430. The control signals from the on/off controller 430 turn the amplifier "On" and "Off." When the amplifier 420 is turned "On" by the on/off controller 430, the amplifier 420 transmits an amplified, isolated ionization current signal $I_{ION}$ 100*a*–100*n* to the peak detector 450 and the integrator 460 for peak detection and integration, respectively.

The reset controller 440 receives the reset control signals 475 from the time process unit (TPU) 470 of the powertrain control module (PCM) 350. The reset controller 440 processes these signals and sends control signals to the peak detector 450 and the ion current integrator 460. The control signals from the reset controller 440 reset the peak detector 450 and the integrator 460 to their respective default values between each engine combustion event. After being reset by the reset controller 440, the peak detector 450 processes the amplified ionization current signal 100*a*–100*n* from the amplifier 420 and generates a peak ionization voltage signal $V_{PEAK}$ 455 for an engine combustion event. After being reset by the reset controller 440, the ion current integrator 460 integrates the amplified ionization current signal 100*a*–100*n* from the amplifier 420 and generates an integrated ionization current signal $I_{INT}$ 465 for an engine combustion event. The peak ionization voltage signal $V_{PEAK}$ 455 and the integrated ionization current signal $I_{INT}$ 465 can be sampled by the main microprocessor 330 of the powertrain control module (PCM) 350 through A/D channels 320 or a similar engine diagnostic and control processor.

The peak detector 450 receives the amplified ionization current signal $I_{ION}$ 100*a*–100*n* from the amplifier 420. The peak detector 450 processes this signal and generates a peak ionization voltage signal $V_{PEAK}$ 455. The peak ionization signal $V_{PEAK}$ 455 equals the peak ionization voltage measured since the last reset of the peak detector 450 during the period when the amplifier 420 is turned "On" by the on/off controller 430. In some embodiments of the invention, the peak ionization voltage signal $V_{PEAK}$ 455 equals the product of the peak ionization signal and a circuit resistance R12. In a preferred embodiment of the invention, the peak detector 450 generates two peak ionization voltage signals $V_{PEAK}$ 455, a first peak ionization voltage signal $V_{PEAK}$ 455 for the ignition phase 220 and a second peak ionization voltage signals $V_{PEAK}$ 455 for the post-ignition phase 230. However, the peak detector 450 may generate more or less than two peak ionization signals $V_{PEAK}$ 455, depending upon engine operating conditions and engine diagnostic routines.

The ion current integrator 460 receives the amplified ionization current signal $I_{ION}$ 100*a*–100*n* from the amplifier 420. The ion current integrator 460 integrates the ionization current signal $I_{ION}$ 100*a*–100*n* following the reset of the ion current integrator 460 to produce an integrated ionization current signal $I_{INT}$ 465. The ion current integrator 460 generates the integrated ionization current signal $I_{INT}$ 465 when the amplifier 420 is turned "On" by the on/off controller 430. In a preferred embodiment of the invention, the ionization current signal $I_{ION}$ 100*a*–100*n* is integrated two times, one time for the ignition phase 220 and one time for the post-ignition phase 230. However, the ion current integrator 460 may generate more or less than two integrated ionization current signals $I_{INT}$ NT 465, depending upon engine operating conditions and engine diagnostic routines.

Figure 6:
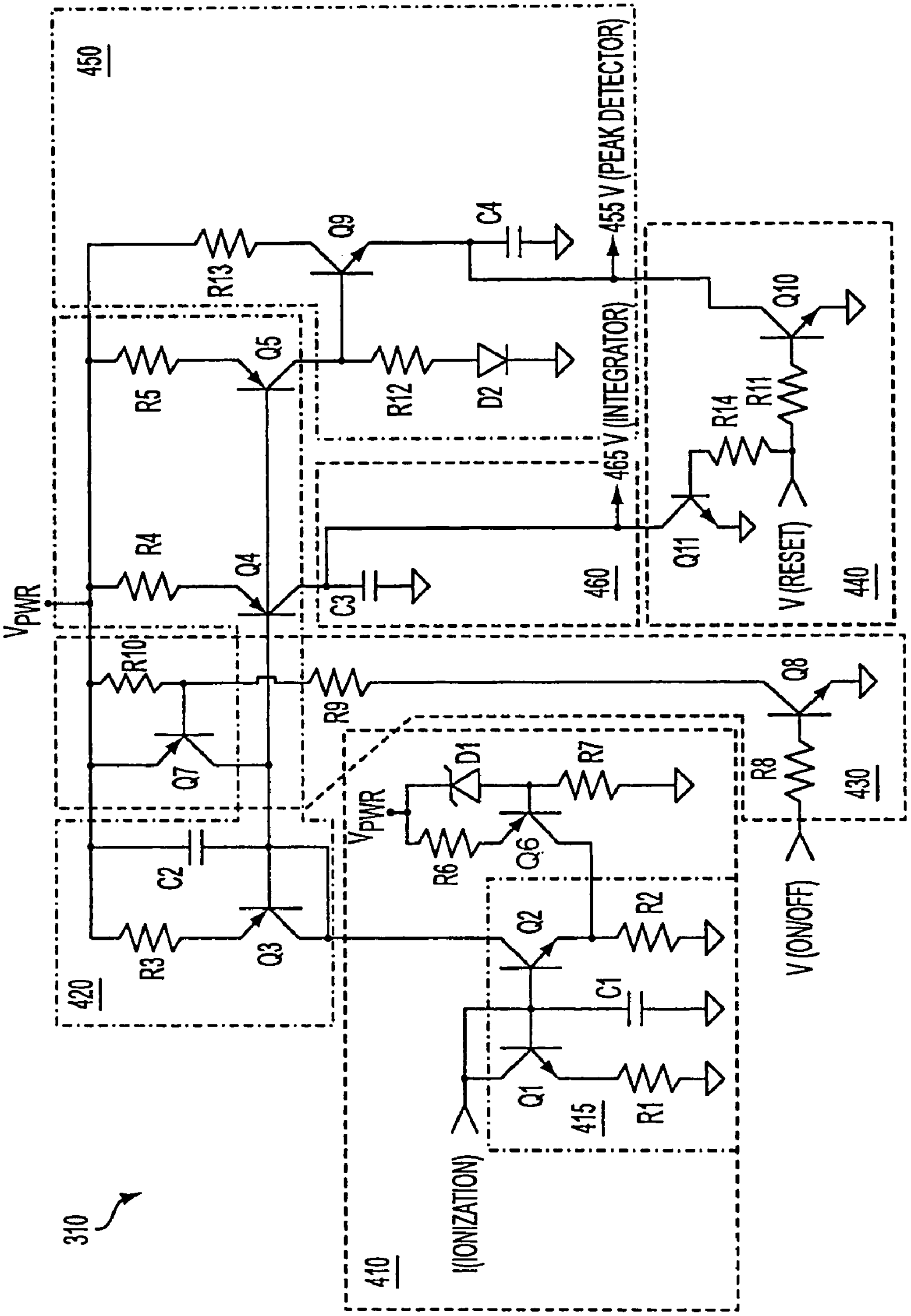
FIG. 6 is an electrical schematic of a circuit for an ionization signal conditioning system.

FIG. 6 shows another preferred embodiment of an analog circuit of the analog signal conditioning system 310 of the present invention. The analog circuit comprises eleven transistors and two diodes, as well as various resistors and capacitors. The transistors shown are bipolar junction (BJT) transistors, however field effect transistors (FET), metal oxide silicon field effect transistors (MOSFET), and other types of amplifiers can also be used. Of course, a person of ordinary skill in the art will recognize that a variety of modifications and variations of this preferred embodiment are within the scope and contemplation of the present invention and that the invention is not limited to the particular components or circuit configuration shown in FIG. 6.

The signal isolator 410 is illustrated with dashed lines in FIG. 6. The signal isolator 410 comprises first, second, sixth, and seventh resistors R1, R2, R6, R7, first, second, and sixth transistors Q1, Q2, Q6, first zener diode D1, and a first capacitor C1. The sixth transistor Q6 has a base, a collector and an emitter. The sixth resistor R6 is operably connected between the emitter of the sixth transistor Q6 and a power supply $V_{PWR}$. The seventh resistor R7 is operably connected between the base of the sixth transistor Q6 and ground. The first diode D1 is operably connected between the base of the sixth transistor Q6 and the power supply $V_{PWR}$. The collector of the sixth transistor Q6 is operably connected to a current mirror circuit 415 of the signal isolator 410.

The current mirror circuit 415 is illustrated with dash-dot-dash-dot lines in FIG. 6. The current mirror circuit 415 comprises first and second transistors Q1, Q2, first and second resistors R1, R2, and a first capacitor C1. The first and second transistors Q1, Q2 each have a base, a collector and an emitter. The bases of the first and the second transistors Q1, Q2 and the collector of the first transistor Q1 are operably connected to the ionization sensors 305*a*–305*n* to receive the ionization current signals 100*a*–100*n* from the ionization sensors 305*a*–305*n*. The first resistor R1 is operably connected between the emitter of the first transistor Q1 and ground. The second resistor R2 is operably connected between the emitter of the second transistor Q2 and ground. The first capacitor C1 is operable connected between the bases of the first and the second transistors Q1, Q2 and ground. The collector of the second transistor Q2 is operably connected to the amplifier 420.

The current mirror circuit 415 provides a current $I_{CQ2}$ at the collector of the second transistor Q2 that is equal to the ionization current signal $I_{ION}$ 100*a*–100*n* multiplied by R1/R2 minus the bias current $I_{BIAS}$ generated by the sixth transistor Q6, the zener diode D1, and the sixth and seventh resistors R6, R7:

$$I_{CQ2}=I_{ION}\times(R1/R2)-I_{BIAS}$$

where: $I_{BIAS}=(V_{D1}-0.7V_{PWR})\div R6$

The amplifier 420 is illustrated by dash-dash-dot lines in FIG. 6. The amplifier 420 comprises third, fourth, and fifth transistors Q3, Q4, Q5, third, fourth, and fifth resistors, and a second capacitor C2. The bases of the third, fourth, and fifth transistors Q3, Q4, Q5 are operably connected to the collectors of the second transistor Q2 and the third transistor Q3. The third, fourth, and fifth resistors R3, R4, R5 are operably connected between the power supply $V_{PWR}$ and the emitters of the third, fourth, and fifth transistors Q3, Q4, Q5, respectively. The second capacitor C2 is operably connected between the power supply $V_{PWR}$ and the bases of the third, fourth, and fifth transistors Q3, Q4, Q5. The amplifier 420 forms a dual current mirror. One current mirror generates a current $I_{CQ4}$ at the collector of the fourth transistor Q4 for the integration of the ionization current signal $I_{ION}$ 100*a*–100*n*. The other current mirror generates a current $I_{CQ5}$ at the collector of the fifth transistor Q5 for the peak detection of the ionization current signal $I_{ION}$ 100*a*–100*n*.

The on/off controller 430 is illustrated by dashed lines in FIG. 6. The on/off controller 430 comprises seventh and eighth transistors Q7, Q8. The base of the eighth transistor Q8 is operably connected to a second output of the time process unit (TPU) 470 to receive an on/off control signal 480. The emitter of the eighth transistor Q8 is operably connected to ground, and the collector of the eighth transistor Q8 is operably connected to the base of the seventh transistor Q7. The eighth resistor R8 is operably connected between the first output of the time process unit (TPU) 470 and the base of the eighth transistor Q8. The ninth resistor R9 is operably connected between the collector of the eighth transistor Q8 and the base of the seventh transistor Q7. The tenth resistor R10 is operably connected between the base of the seventh transistor Q7 and the power supply $V_{PWR}$.

The on/off controller 430 controls the operation of the amplifier 420, as follows. The on/off controller 430 receives an on/off control signal 480 from the first output of the time process unit (TPU) 470 at the base of the eighth transistor Q8. When the on/off signal 480 is high, the on/off controller 430 is "Off." This occurs because the eighth transistor Q8 becomes saturated, causing the seventh transistor Q7 to become saturated and the amplifier 420 to be turned "Off." When the on/off signal 480 input to the on/off controller 430 is low, the on/off controller 430 is "On." This occurs because the seventh transistor Q7 and the eighth transistor Q8 are cutoff. Thus, the amplifier 420 is biased "On."

When the on/off controller 430 is "On," the collector current $I_{CQ4}$ of the fourth transistor Q4 is defined by:

$$I_{CQ4}=(I_{ION}\times(R1/R2)-I_{BIAS})\times R3/R4$$

while the collector current of the fifth transistor Q5 is defined by:

$$I_{CQ5}=(I_{ION}\times(R1/R2)-I_{BIAS})\times R3/R5$$

When the on/off controller 430 is "Off," the collector current $I_{CQ4}$ of the fourth transistor Q4 and the collector current $I_{CQ5}$ of the fifth transistor Q5 are zero.

The peak detector 450 is illustrated by a dash-dot-dash-dot line in FIG. 6. The peak detector 450 comprises a ninth transistor Q9, twelfth and thirteenth resistors R12, R13, a second diode D2, and a fourth capacitor C4. The base of the ninth transistor Q9 is operably connected to the collector of the fifth transistor Q5 to receive the mirror current generated by the amplifier 420 for peak detection. The emitter of the ninth transistor Q9 is operably connected to the collector of the tenth transistor Q10 of reset controller 440. The twelfth resistor R12 is operably connected to the collector of the fifth transistor Q5 and the base of the ninth transistor Q9. The second diode D2 is operably connected between the twelfth resistor R12 and ground. The thirteenth resistor R13 is operably connected between the collector of the ninth transistor Q9 and the power supply $V_{PWR}$. The fourth capacitor C4 is operably connected between the emitter of the ninth transistor Q9 and ground. If a selected time constant, e.g., R13×C4, is small enough, the voltage of the fourth capacitor C4 (i.e., $V_{C4}$) equals the peak voltage of the twelfth resistor R12 when the on/off controller 430 is "On." This voltage may be output as a peak ionization voltage signal $V_{PEAK}$ 455. When the on/off controller 430 is turned "Off," the voltage $V_{C4}$ at the fourth capacitor C4 is unchanged.

The ion current integrator 460 is illustrated by a dashed line in FIG. 6. The ion current integrator 460 comprises a third capacitor C3, which is an energy storage device that is operably connected between the collector of the fourth transistor Q4 and ground and receives the other mirror current generated by the amplifier 420. The collector current $I_{CQ4}$ of the fourth transistor Q4 charges the third capacitor C3. The voltage stored at the third capacitor C3 may be calculated as a function of this collector current $I_{CQ4}$ as:

$$V_{C3}=1/C3\times\int I_{CQ4}dt$$

Therefore, the voltage $V_{C3}$ that is stored at the third capacitor C3 represents the integrated value of the collector current $I_{CQ4}$ of the fourth transistor Q4 scaled by the inverse capacitance of the third capacitor C3. This voltage $V_{C3}$ can be used as a measure of the integrated value of the ionization current signal $I_{ION}$ 100*a*–100*n*. This voltage $V_{C3}$ may be output as an integration ionization signal $I_{INT}$ 465 due to the relationship of voltage to current disclosed in Ohm's law.

The reset controller 440 is illustrated by dashed lines in FIG. 6. The reset controller 440 comprises tenth and eleventh transistors Q10 and Q11, and eleventh and fourteenth resistors R11 and R14. The bases of both the tenth and the eleventh transistors Q10 and Q11 are operably connected to a second output of the time phase unit (TPU) 470 through eleventh and fourteenth resistors R11 and R14. The emitter of both tenth and eleventh transistor Q10 and Q11 are operably connected to ground. The collector of the tenth transistor Q10 is operably connected to the fourth capacitor C4, and the collector of the eleventh transistor Q11 is operably connected to the third capacitor C3. The eleventh and fourteenth resistors R11 and R14 are operably connected between the bases of the tenth and eleventh transistors Q10 and Q11 and the second output of the time phase unit (TPU) 470, respectively. The reset controller 440 receives a reset control signal 475 from the second output of the time phase unit (TPU) 470 at both bases of the tenth and the eleventh transistors Q10 and Q11. When the input to the reset controller 440 is high, the third capacitor C3 and the fourth capacitor C4 discharge capacity by bleeding current through the tenth and eleventh transistors Q10 and Q11, respectively. This discharge resets the voltages $V_{C3}$, $V_{C4}$ of the third and fourth capacitors C3, C4, respectively, to approximately 0.3 volts. The third and fourth capacitors C3, C4 can function as noise reduction devices, as well, if needed.

In a preferred embodiment of the invention, the values of the resistors and capacitors may be as shown in the following table:

| | |
|---|---|
| R1 | 180 Ω |
| R2 | 180 Ω |
| R3 | 100 Ω |

-continued

| | |
|---|---|
| R4 | 680 Ω |
| R5 | 560 Ω |
| R6 | 820 Ω |
| R7 | 470 Ω |
| R8 | 3.3 KΩ |
| R9 | 2.0 kΩ |
| R10 | 1 Ω |
| R11 | 33 Ω |
| R12 | 1 KΩ |
| R13 | 39 Ω |
| R14 | 33 Ω |
| C1 | 100 PF |
| C2 | 1000 PF |
| C3 | 1 μF |
| C4 | 0.221 μF |

However, one or ordinary skill in the art will recognized that a variety of resistance and capacitance values may be used for the resistors and capacitors and still be within the scope of the present invention.

Figure 7:
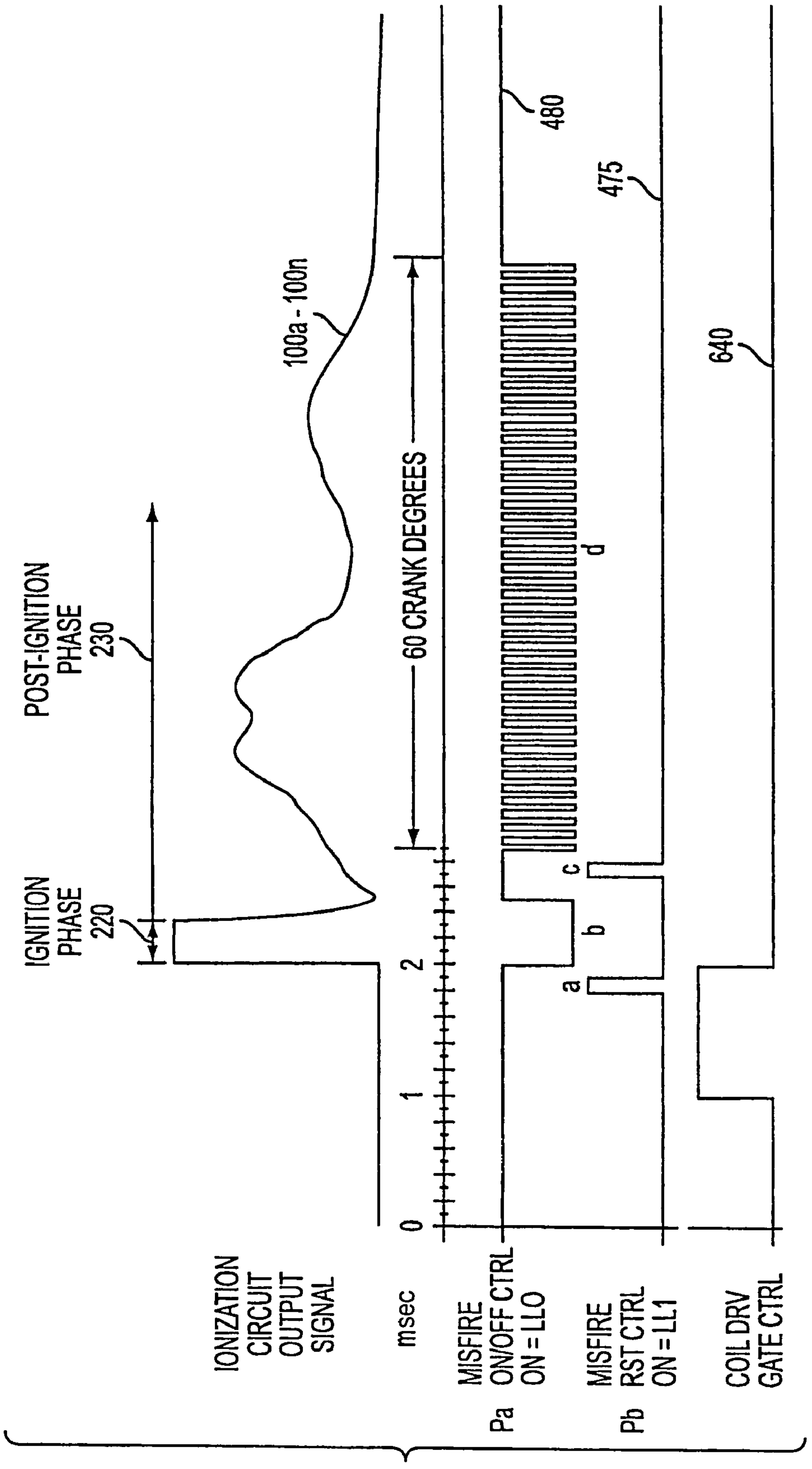
FIG. 7 is a graph of an ionization sensor signal, an on/off control signal, a reset control signal, and an ignition charge signal.

FIG. 7 shows a typical sequence of an ionization sensor signal 100*a*–100*n* that is processed by the analog signal conditioning system 310 together with the on/off control signals 480 and the reset control signals 475 that are transmitted by the time phase unit (TPU) 470 to the analog signal conditioning circuit 310. In this example, the on/off control signal 480 and the reset control signal 475 of the time phase unit (TPU) 470 are misfire circuit control signals Pa, Pb. The ionization current signal $I_{ION}$ 100*a*–100*n* appears as the top curve of the chart and shows the ionization current signal $I_{ION}$ 100*a*–100*n* before, during, and after ignition. The on/off misfire control signal Pa 480 is the second curve from the top of the chart. The reset misfire control signal Pb 475 is the third signal curve from the top of the chart. An ignition charge signal 640 is shown as the bottom curve on the chart. The on/off misfire control signal Pa 480 and the reset misfire control signal Pb 475 are pulse-trains. LL0 and LL1 represent Logic Level 0 and Logic Level 1, respectively, of the pulse-train circuit control signals Pa 480, Pb 475.

The on/off control signal Pa 480 and the reset control signal, Pb 475 can be described according to the following regions. Initially, at time=0 msec, both of the pulse-train control signals Pa 480, Pb 475 are in their "Off" states. This "Off" state is indicated as LL1 (active "High") for the on/off control signal Pa 480 and LL0 (active "Low") for the reset control signal Pb 475. In Region a, the reset control signal Pb 475 is turned "On" and "Off" to reset the integrator 460 and the peak detector 450 of the analog signal conditioning system 310 prior to the ignition phase 220. This resetting enables the peak detector 450 to generate a peak ionization voltage signal $V_{PEAK}$ 455 and the integrator 460 to generate an integrated ionization signal $I_{INT}$ 465 for the ignition phase 220.

In Region b, the on/off control signal Pa 480 is turned "On." The on/off controller 430 turns the amplifier 420 "On" so that the peak detector 450 receives an amplified ionization current signal $I_{ION}$ 100*a*–100*n* and generates a peak ionization voltage signal $V_{PEAK}$ 455 for the ignition phase 220. The integrator 460 receives an amplified ionization current signal $I_{ION}$ 100*a*–100*n* and generates an integrated ionization signal $I_{INT}$ 465 for the ignition phase 220. The integrated ionization signal $I_{INT}$ 465 can be used in the operation of the open-secondary coil detection and the cylinder identification diagnostic routines of the powertrain control module (PCM) 350.

In the region between Region b and Region c, the on/off control signal Pa 480 is turned to the "Off" state. This turns the amplifier 420 "Off" and stops any further charging of the peak detector 450 and the integrator 460. The integrated ionization signal $I_{INT}$ 465 may be compared to a threshold value to determine whether a proper ignition charge was delivered to the cylinder, i.e., whether a spark occurred. If the integrated ionization signal $I_{INT}$ 465 for the spark window, i.e., the ignition phase 220, exceeds a threshold value, a determination is made that a spark has occurred. If the integrated ionization signal $I_{INT}$ 465 is below this threshold value, it is determined that no spark occurred. Note that the spark window of Region b is approximately 500 microseconds in FIG. 7. However, a spark window of greater or lesser duration can be used depending on engine operating conditions and ignition systems. For example, the spark window can last anywhere between 300 microseconds and 3 milliseconds, depending on the actual spark duration of a given ignition system.

In Region c, the reset control signal Pb 475 is turned "On" and "Off." This control action resets the integrator 460 and the peak detector 450 to their default values. Thus, peak detection and integration may be conducted for the ionization current signal $I_{ION}$ 100*a*–100*n* produced during the post-ignition phase 230.

In Region d, the reset control signal Pb 475 is maintained in an "Off" state, and the on/off control signal Pa 480 is turned "On" and "Off" during the post-ignition phase 230. This control action enables the peak detector 450 and the integrator 460 to detect the peak ionization voltage signal $V_{PEAK}$ 455 and the integrated ionization signal $I_{INT}$ 465, respectively, for misfire detection during the post-ignition phase 230. The on/off control signal Pa 480 uses pulse width modulation (PWM) to adjust the ionization current signal $I_{ION}$ 100*a*–100*n*. The pulse width modulation ensures that the peak ionization voltage signal $V_{PEAK}$ 455 and the integrated ionization signal $I_{INT}$ 465 can be calculated for the post-ignition phase 230 at varying engine revolutions per minute (RPM) without overflow occurring. The frequency is fixed at 10 kHz. However, a higher or lower frequency may be used depending upon engine operating conditions.

The on/off control signal Pa 480 varies the pulse width duty cycle during an ON-cycle according to engine RPM, as follows:

| | |
|---|---|
| RPM < 1500 | 20% Duty Cycle |
| 1500 ≦ RPM < 3000 | 40% Duty Cycle |
| 3000 ≦ RPM < 4500 | 60% Duty Cycle |
| 4500 ≦ RPM < 6000 | 80% Duty Cycle |
| 6000 ≦ RPM | 100% Duty Cycle |

After Region d, the on/off control signal Pa 480 is turned "Off" and the reset control signal Pb 475 remains "Off." The outputs of the integrator 460 and the peak detector 450 are read to yield the integrated ionization signal $I_{INT}$ 465 and the peak ionization voltage signal $V_{PEAK}$ 455, respectively, for the post-ignition phase 230.

FIG. 8 is a table showing further the relationship of the on/off control signal Pa 480 and the reset control signal Pb 475. An analog-to-digital (A/D) sampling resolution is shown at the bottom row of the table. The calibration parameters P1, P2 are coefficients that may be calibrated to varying engine operating conditions. The typical values of the calibration parameters P1, P2 are 200 μs and 60 crank degrees, respectively. However, the calibration parameters P1, P2 may have values that are greater or less than these values, depending upon varying engine operating and performance characteristics.

As can be seen from the table of FIG. 8, the on/off control signal Pa 480 is “Off” in Region a and between Regions a and b. It is “On” in Region b, then “Off” until Region d at which point the pulse width modulation (PWM) duty cycle begins. The reset control signal Pb 475 is “On” in Regions a and c and “Off” during the remainder of the engine combustion cycle. The nominal duration shown for each region may be varied.

The duty cycle of the pulse width modulation (PWM) signal is a function of the engine speed in revolutions per minute (RPMs), as described above. The pulse width modulation (PWM) is used over Region d primarily to avoid integration overflow and to obtain a good signal-to-noise ratio. The integration window of Region d is based on crank degrees of the engine cycle. The integration window is typically taken over 60 crank degrees. Of course, an integration window of more or less than 60 crank degrees may be used. At 600 RPM, an integration window of 60 crank degrees has a duration of approximately 16.67 ms. At 6000 RPM, an integration window of 60 crank degrees has a duration of approximately 1.667 ms. Thus, the time based integration of the current ionization signal $I_{ION}$ 100*a*–100*n* over a fixed crank degree increases by a factor of ten at 600 RPM, compared to the time based integration of the ionization signal $I_{ION}$ 100*a*–100*n* over the same fixed crank degree at 6,000 RPM. A conventional approach to avoiding overflow in this scenario is to use variable integration gain. However, this approach is relatively expensive to implement, particularly in an analog circuit. According to the present invention, a pulse width modulation (PWM) signal may be used to switch the amplifier 420 “On” and “Off” so that integration is continuous at high engine RPMs and discontinuous with certain duty cycles when the engine speed falls below a selected RPM. This approach avoids integrator overflow while maintaining a good resolution of the signal output.

Figure 9:
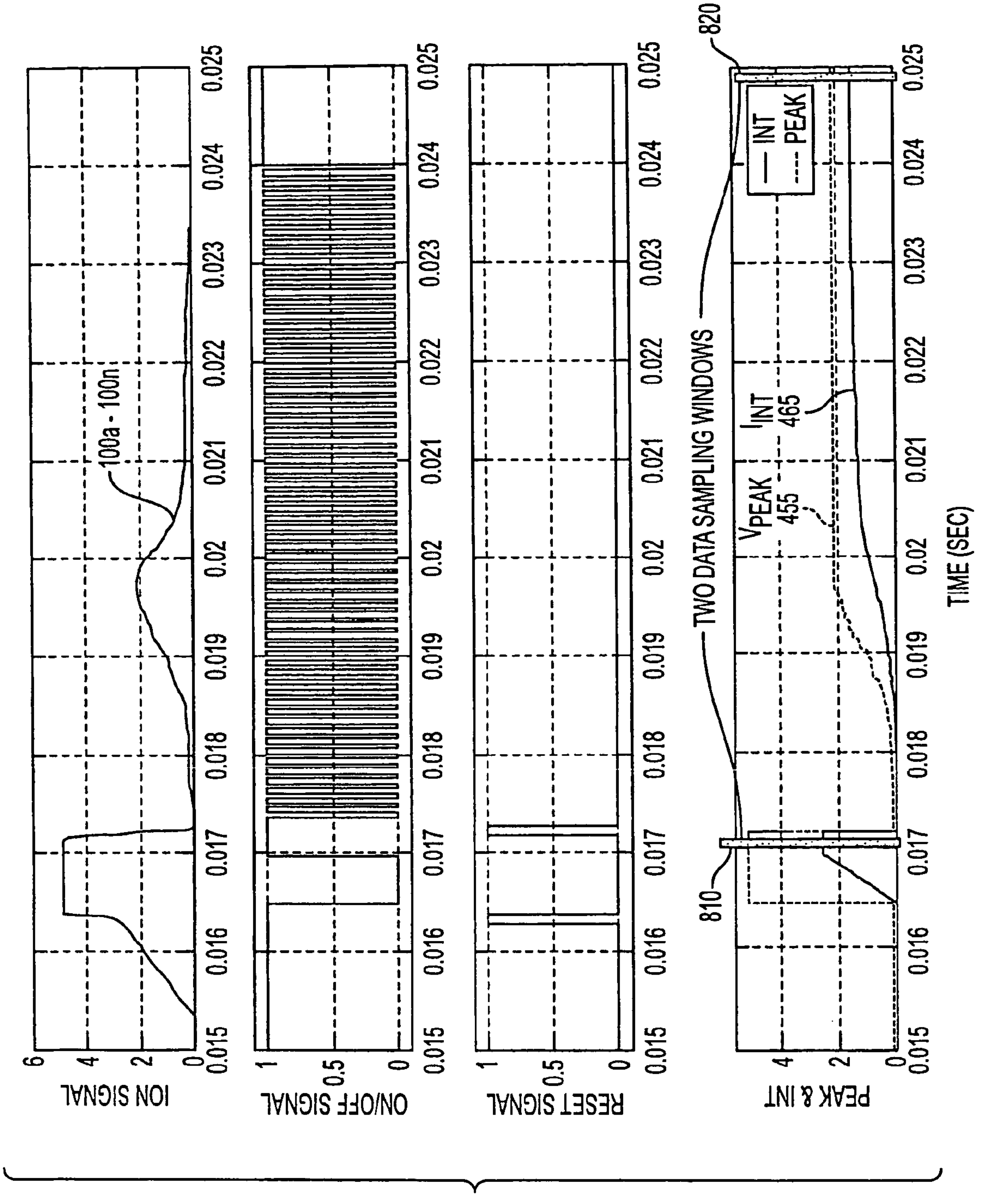
FIG. 9 is a graph of peak and integrated ionization signals, as well as ionization current and control signals in a normal combustion case.
Figure 10:
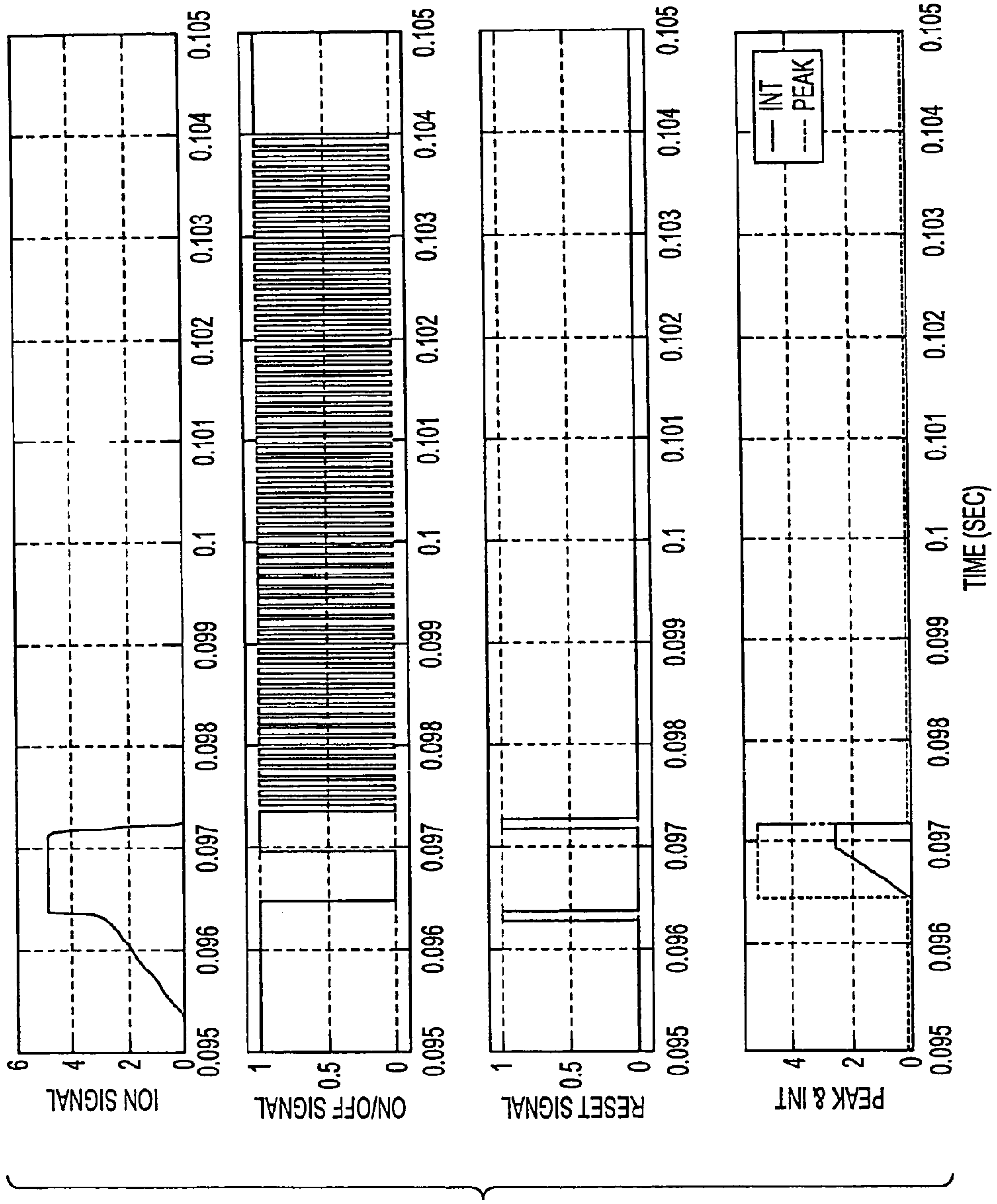
FIG. 10 is a graph of peak and integrated ionization signals, as well as ionization current and control signals in a spark only case.

FIGS. 9 and 10 show the peak ionization voltage signal $V_{PEAK}$ 455 and the integrated ionization signal $I_{INT}$ 465 that are output by the analog conditioning system 310 for the normal combustion case (FIG. 9) and the spark only case (FIG. 10). As shown in FIG. 9, two data sampling windows 810, 820 are take to determine the integrated ionization current value $I_{INT}$ 465 and the peak ionization voltage value $V_{PEAK}$ 455. A first data sampling window 810 is taken during the ignition phase 220. A second data sampling window 820 is taken during the post-ignition phase 230. The analog signal conditioning system 310 processes the data from these two samples to generate a peak ionization voltage signal $V_{PEAK}$ 455 and an integrated ionization value $I_{INT}$ 465 for both the ignition phase 220 and the post-ignition phase 230. The analog signal conditioning system 310 can output these values to the main microprocessor 330 of the powertrain control module (PCM) 350. Therefore, the analog signal conditioning system 310 of the present invention samples the ionization current signal $I_{ION}$ 100*a*–100*n* during the ignition phase 220 and the post-ignition phase 230 and generates two peak $V_{PEAK}$ 455 and two integrated $I_{INT}$ 465 ionization signal values, one for each engine combustion cycle. These four parameters are sent to the main processor 330 of the powertrain control module (PCM) 350 for cylinder identification, engine diagnostics, and misfire/partial bum detection in each engine combustion cycle. A person of ordinary skill in the art will appreciate that any number of data sampling windows may be used according to the present invention, depending upon engine diagnostic requirements, operating conditions, and similar parameters.

The use of the analog signal conditioning system of the present invention significantly reduces the data sampling rate. According to the present invention, the ionization current signal $I_{ION}$ 100*a*–100*n* from each cylinder may be sampled two times for each engine combustion event (e.g., ignition phase, post-ignition phase). This sampling rate is substantially less than the hundreds of samples taken per engine combustion event in engine diagnostic systems that use a microprocessor to sample ionization current signal directly. In these systems, the ionization current signal $I_{ION}$ 100*a*–100*n* must be sampled at least every crank degree or several hundred times per cycle. By reducing the data sampling rate to two times per engine combustion event, the present invention reduces the data sample rate by a factor of over 100, producing considerable savings and increased efficiencies.

The analog circuit 310 of the present invention may be integrated with the powertrain control module (PCM) 350, e.g., it may be part of the same circuit board, as shown in FIG. 4. This configuration minimizes manufacturing costs while increasing the flexibility of the system. The memory 340 of the powertrain control module (PCM) 350 does not have to be increased to accommodate an increased data sample rate because the analog circuit 310 outputs two data samples for each engine combustion cycle. The use of pulse width modulation enables the analog circuit 310 to condition and output two peak ionization voltage signals $V_{PEAK}$ and two integrated ionization signals $I_{INT}$ over a wide range of engine operating conditions. Also, the engine diagnostic routines 335 of the powertrain control module (PCM) 350 may be varied for different operating conditions. This flexibility enables the main processor 330 of the powertrain control module (PCM) 350 to process conditioned signals transmitted from the analog circuit 310 over a wide range of operating conditions. In a preferred embodiment, the analog-to-digital (A/D) converter 320 can be part of the main processor 330. In other embodiments of the invention, the analog circuit 310 may be separate from the powertrain control module (PCM) 350.

Figure 11:
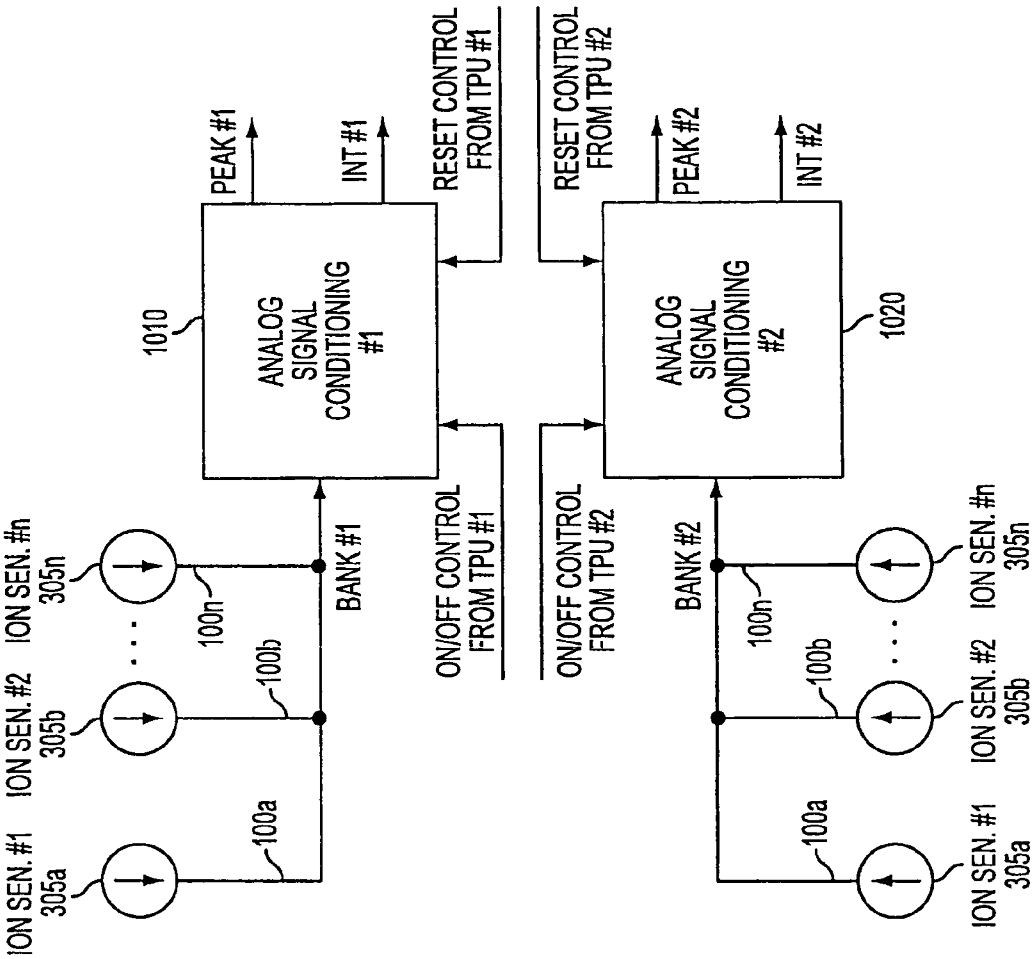
FIG. 11 illustrates an engine diagnostic system.

An engine diagnostic system may comprise two or more analog circuits that process and condition ionization current signal $I_{ION}$ 100*a*–100*n*. FIG. 11 shows an embodiment of the invention in which an engine diagnostic system comprises two analog circuits 1010, 1020. In this embodiment, the cylinders of the IC engine may be divided into two cylinder banks, Bank #1, Bank #2. Each of the cylinder banks, Bank #1, Bank #2, is connected, respectively, to one of the analog circuits 1010, 1020, as shown in FIG. 11. In an application for a four-cylinder IC engine with a firing order of 1, 3, 4, 2, Bank #1 may comprise cylinders 1, 3, and Bank #2 may comprise cylinders 2, 4. For a “V” engine, the cylinders of the IC engine may be divided between Banks #1 and #2. Division of the IC engine cylinders into Banks #1 and #2 enables the pairing of the cylinders into offsetting compression/expansion and exhaust/intake strokes. This configuration improves cylinder identification and avoids interference between the ionization signals, particularly as the number of cylinders increases. The analog circuits 1010, 1020 may be configured according to the embodiments disclosed and described in FIGS. 5 and 6.

In a preferred embodiment of the invention in which two data sampling windows are used for an engine combustion event, each analog signal conditioning circuit 1010, 1020 conditions two ionization signal samples to generate four values—two integrated ionization values $I_{INT}$ 465 and two peak ionization voltage values $V_{PEAK}$ 455. Together, the analog circuits 1010, 1020 condition four ionization signal samples and produce eight values per engine combustion cycle. The analog circuits 1010, 1020 transmit those values to the powertrain control module (PCM) 350 for cylinder identification, misfire/partial bum detection, and various ignition diagnostic routines.

Thus, the analog circuit, method, and system according to the present invention provide an improved method, system, and circuit to detect and condition the ionization current signal $I_{ION}$ 100*a*–100*n*. The method, system, and circuit of the present invention provide an inexpensive, accurate configuration to detect and condition ionization current signal $I_{ION}$ 100*a*–100*n*, so that the signals may be processed further in the powertrain control module (PCM) 350 for engine diagnostics and closed-loop engine control. Not only does the present invention provide an inexpensive, accurate means to detect and condition ionization current signal, it also reduces the data sampling rate substantially, so that the conditioned signals produced by the analog circuit of the present invention may be handled by the powertrain control module (PCM) 350 without the addition of extra memory or faster microprocessors normally required to handle the higher throughput of known systems and methods that use much higher data sampling rates. A person of ordinary skill in the art will recognize that the analog signal conditioning systems of the invention may comprise more than two separate analog circuits 310 and that the data sampling rate may occur one or more times per combustion cycle to generate one or more peak and integrated ionization signals for a wide range of engine diagnostic routines, some of which are discussed below.

The method, circuit, and system of the present invention may be used for cylinder identification. The analog signal conditioning system 310 of the present invention can be used to integrate the ionization signal over the spark window (i.e., the spark duration during the ignition phase 220) for each cylinder. This integrated value can be used to determine which cylinder is in compression.

In another embodiment of the invention, the analog conditioning circuit, system, and method may be used for engine misfire and partial-bum diagnostics. Engine misfire and partial-burn diagnostics mainly use integrated $I_{INT}$ and peak $V_{PEAK}$ ionization signals over Region d of the post-ignition phase 230. When the peak ionization voltage signal $V_{PEAK}$ 455 and the integrated ionization current signal $I_{INT}$ 465 are greater than respective threshold values, normal combustion is declared. If only one of the peak ionization voltage signal $V_{PEAK}$ 455 and the integrated ionization signal $I_{INT}$ 465 exceeds their respective threshold values, a partial-burn combustion is declared. If both the peak ionization voltage signal $V_{PEAK}$ 455 and the integrated ionization signal $I_{INT}$ 465 are less than their respective threshold values, a misfire is declared.

The analog signal conditioning circuit, system, and method also may be used in the performance of other engine diagnostics, such as open-secondary winding detection, failed coil, failed ion-sensing sensing assembly, input short to ground, bank sensor short, and input short to battery diagnostic routines.

The method, circuit, and system of the present invention are less expensive to manufacture and operate than known circuits and systems that sample ionization signals directly. A separate processor is not needed for sampling, because the lower data sampling rate requires less memory and lower operating speed for the powertrain control module (PCM) main processor 330. A person of ordinary skill in the art will recognize that other circuits and variations of the circuit of the present invention may be used to condition ionization signals and such circuits and their methods of use are within the scope of the present invention.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An analog signal conditioning circuit, comprising:

a signal isolator having an input and an output;

an amplifier having a first and a second input, and a first and a second output, wherein said first input is operably connected to said signal isolator output;

a peak detector having a first and a second input, and an output, wherein said first input is operably connected to said first output of said amplifier; and an integrator having a first and a second input, and an output, wherein said first input is operably connected to said second output of said amplifier.

2. The analog conditioning circuit of claim 1 wherein said signal isolator comprises a current mirror and said amplifier comprises a current mirror.

3. The analog conditioning circuit of claim 1 further comprising:

a time processor having a first and a second output; and a reset controller having an input, and a first and a second output, wherein said input is operably connected to said second output of said time processor, wherein said first output is operably connected to said second input of said integrator and said second output is operably connected to said second input of said peak detector.

4. The analog conditioning circuit of claim 1 further comprising:

a time processor having a first and a second output; and an on/off controller having an input and an output, wherein said input is operably connected to said first output of said time processor and said output is operably connected to said second input of said amplifier.

5. The analog conditioning circuit of claim 1 further comprising:

a time processor having a first and a second output;

a reset controller having an input, and a first and a second output, wherein said input is operably connected to said second output of said time processor and wherein said first output is operably connected to said second input of said integrator and wherein said second output is operably connected to said second input of said peak detector; and an on/off controller having an input operably connected to said first output of said time processor and an output operably connected to said second input of said amplifier.

6. The analog conditioning circuit of claim 1 wherein said integrator comprises a capacitor operably connected between said second output of said amplifier and ground.

7. The analog conditioning circuit of claim 1 further comprising a time processor having a first and a second output wherein said reset controller comprises a first and a second transistor each having a first terminal, a second terminal, and a third terminal, wherein said first terminal of each of said transistors is operably connected to a second output of said time processor to receive a reset signal, said second terminal of said first transistor is operably connected to said output of said integrator, said second terminal of said second transistor is operably connected to said output of said peak detector, and said third terminal or each of said transistors is grounded.

8. The analog conditioning circuit of claim 1 wherein said peak detector comprises:

a transistor having a first, a second and a third terminal, wherein said first terminal is operably connected to said first output of said amplifier;

a resistor is operably connected between said second terminal and a power supply; and a capacitor is operably connected between said third terminal and ground.

9. The analog conditioning circuit of claim 1 further comprising a time processor having a first and a second output, wherein said integrator comprises a capacitor;

said reset controller comprises a first and a second transistor each having a first terminal, a second terminal, and a third terminal, wherein said first terminal of each of said transistors is operably connected to a second output of said time processor to receive a reset signal, said second terminal of said first transistor is operably connected to said output of said integrator, said second terminal of said second transistor is operably connected to said output of said peak detector, and said third terminal or each of said transistors is grounded; and said peak detector comprises a transistor having a first, a second and a third terminal, wherein said first terminal is operably connected to said first output of said amplifier;

a resistor is operably connected between said second terminal and a power supply; and a capacitor is operably connected between said third terminal and ground.

10. An engine, comprising:

a plurality of cylinder banks; and a plurality of analog signal conditioning circuits operably connected to each of said plurality of cylinder banks, wherein at least one of said analog signal conditioning circuits comprises:

a signal isolator having an input and an output;

an amplifier having a first and a second input, and a first and a second output, wherein said first input is operably connected to said output of said signal isolator;

a peak detector having a first and a second input, and an output, wherein said first input is operably connected to said first output of said amplifier; and an integrator having a first and a second input, and an output, wherein said first input is operably connected to said second output of said amplifier.

11. The engine of claim 10 further comprising:

a time processor having a first and a second output;

a reset controller having an input, and a first and a second output, wherein said input is operably connected to said second output of said time processor and wherein said first output is operably connected to said second input of said integrator and said second output is operably connected to said second input of said peak detector; and an on/off controller having an input operably connected to said first output of said time processor and an output operably connected to said second input of said amplifier.

12. The engine of claim 10 wherein said analog signal conditioning circuit is operably part of a powertrain control module.

* * * * *

UNITED STATES PATENT AND TRADEMARK OFFICE

CERTIFICATE OF CORRECTION

PATENT NO. : 7,197,913 B2

APPLICATION NO. : 10/655273
DATED : April 3, 2007
INVENTOR(S) : Guoming G. Zhu et al.

It is certified that error appears in the above-identified patent and that said Letters Patent is hereby corrected as shown below:

On Title Page item 56

On page 2 of the Title Page, Foreign Patent Documents, “WO 97124527 A1” should be --WO 97/24527 A1--.

Column 3, line 8, after “signal” delete “how”.

Column 3, line 43, before “graph” insert --a--.

Column 3, line 66, “convener” should be --converter--.

Column 4, line 6, “enaine” should be --engine--.

Column 4, line 6, “fbrther” should be --further--.

Column 6, line 11, before “465” delete “NT”.

Column 7, line 2, after “capacitor insert --,--.

Column 11, line 65, “bum” should be --burn--.

Column 13, line 6, “bum” should be --burn--.

Column 13, line 42, “partial-bum” should be --partial-burn--.

Column 14, line 62, Claim 7, after “output” insert --,--.

Signed and Sealed this

Twenty-second Day of May, 2007

JON W. DUDAS
*Director of the United States Patent and Trademark Office*

UNITED STATES PATENT AND TRADEMARK OFFICE

CERTIFICATE OF CORRECTION

PATENT NO. : 7,197,913 B2
APPLICATION NO. : 10/655273
DATED : April 3, 2007
INVENTOR(S) : Guoming G. Zhu et al.

It is certified that error appears in the above-identified patent and that said Letters Patent is hereby corrected as shown below:

On page 2 of the Title Page, Foreign Patent Documents, “WO 97124527 A1” should be --WO 97/24527 A1--.

Column 3, line 8, after “signal” delete “how”.

Column 3, line 43, before “graph” insert --a--.

Column 3, line 66, “convener” should be --converter--.

Column 4, line 6, “enaine” should be --engine--.

Column 4, line 6, “fbrther” should be --further--.

Column 6, line 11, before “465” delete “NT”.

Column 7, line 2, after “capacitor insert --,--.

Column 11, line 65, “bum” should be --burn--.

Column 13, line 6, “bum” should be --burn--.

Column 13, line 42, “partial-bum” should be --partial-burn--.

Column 14, line 62, Claim 7, after “output” insert --,--.

This certificate supersedes the Certificate of Correction issued May 22, 2007.

Signed and Sealed this

Twenty-fourth Day of June, 2008

JON W. DUDAS
*Director of the United States Patent and Trademark Office*